No. 655,231. Patented Aug. 7, 1900.
T. HAWKINS.
CHAMBER POT, &c.
(Application filed Nov. 17, 1899.)

(No Model.) 2 Sheets—Sheet 1.

Witnesses:
H. Gee.
J. Lewis

Inventor:
Thomas Hawkins.
By [signature]
Attorneys.

No. 655,231.

T. HAWKINS.
CHAMBER POT, &c.
(Application filed Nov. 17, 1899.)

Patented Aug. 7, 1900.

(No Model.)

2 Sheets—Sheet 2.

Witnesses:
H. Gee.
L. Ferris

Inventor:
Thomas Hawkins.
By
Attorneys.

UNITED STATES PATENT OFFICE.

THOMAS HAWKINS, OF LONDON, ENGLAND.

CHAMBER-POT, &c.

SPECIFICATION forming part of Letters Patent No. 655,231, dated August 7, 1900.

Application filed November 17, 1899. Serial No. 737,303. (No model.)

*To all whom it may concern:*

Be it known that I, THOMAS HAWKINS, a citizen of the United States, residing at 40 Marchmont street, Russell Square, London, England, have invented certain new and useful Improvements in and Relating to Chamber-Pots and Like Vessels, of which the following is a specification.

My present invention relates to chamber-pots and like vessels; and it consists of certain improvements hereinafter described.

I provide by my invention an appliance to be put within the pot or like vessel, where it may always remain, (excepting when it may require to be removed for cleaning or for emptying the vessel,) affording a cover which is both sanitary and sightly and which enables the vessel to remain perfectly silent in use, meeting a great want, especially in dormitories, hospital-wards, thinly-partitioned houses, and rooms occupied by several persons. My invention or appliance has the further merits of being easily cleanable, the upper part being separable from the lower, very light to handle, easy to mold or manufacture, applicable or adaptable to vessels of different sizes, and readily and quickly fixed in position. The lower part may remain as a permanent fixture, if desired, the upper portion, which is above the level of the contents of the vessel, being capable of being lifted away without causing any dripping of water.

According to my invention I combine a shallow funnel with a short stem or post in such a way that the latter may stand upon or be fixed to the bottom of the vessel, being seldom or never removed therefrom, while the funnel is removable, but rests normally upon said stem, its outer circumference fitting easily within the rim of the vessel a little below the top edge. The funnel preferably carries a flange and also rings or equivalent means for facilitating removal. The stem or post is adapted to conduct liquid upon its outer surface from the funnel into the chamber-pot and is constructed and applied as hereinafter set forth.

Figure 1:
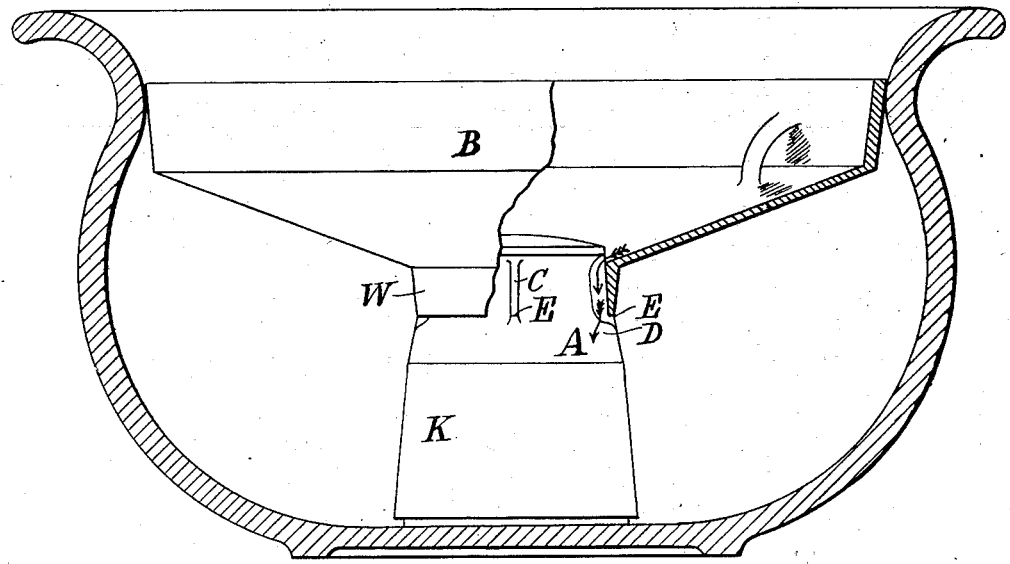
Figure 2:
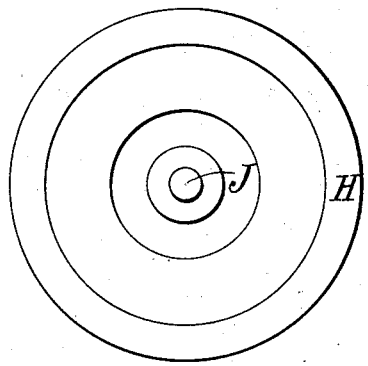
Figure 3:
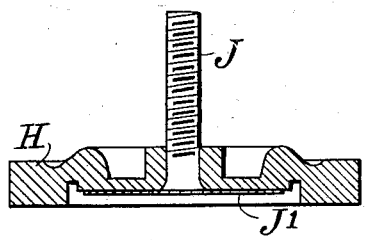
Figure 4:
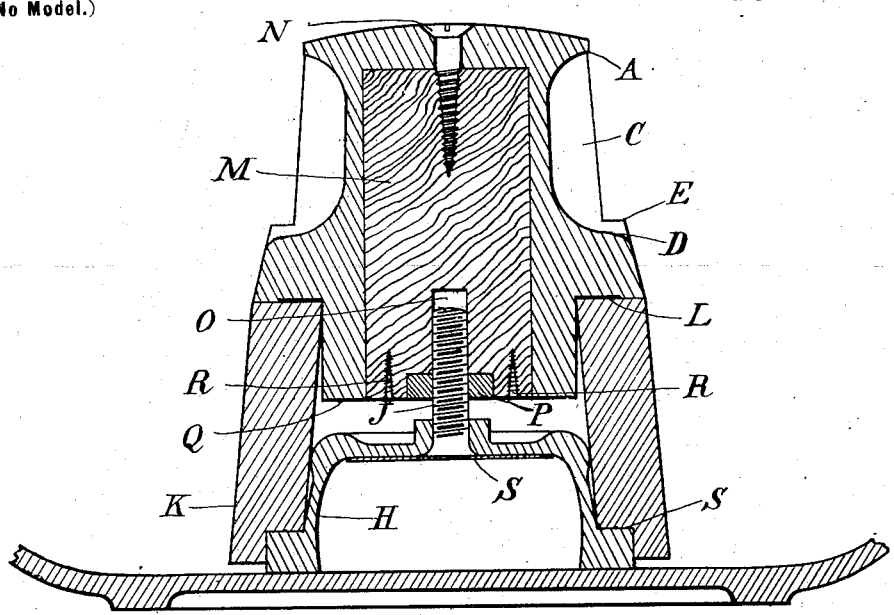
Figure 5:
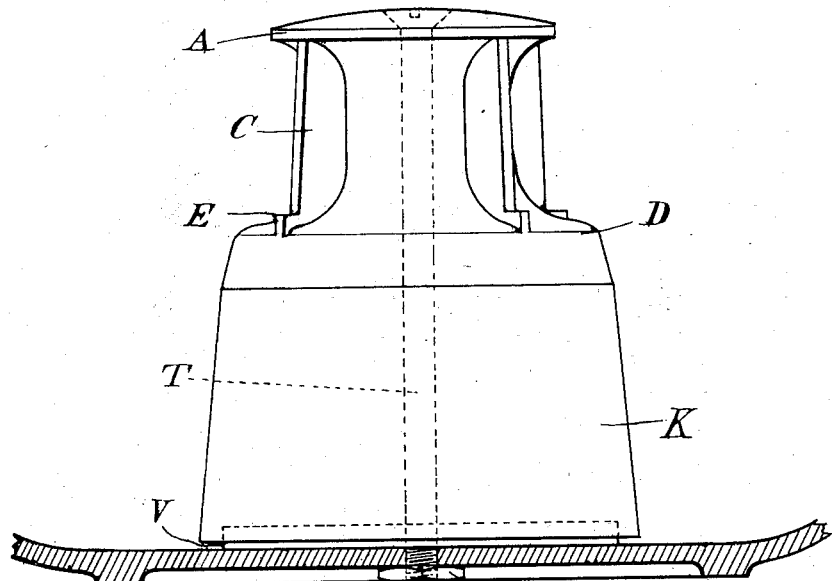

Referring to the accompanying drawings, Figure 1 is a section of a pot, showing my appliance contained therein, part of the funnel being in section; Figs. 2 and 3, plan and cross-section, respectively, of a rubber suction disk and stem, forming part of my appliance; Fig. 4, a section of the stem or post shown upon an enlarged scale, and Fig. 5 an elevation of the stem or post with a modified form of attachment to the bottom of the pot.

The shape of the stem or post may be very slightly conical, narrowing from the base upward. The topmost portion A (shown more fully in Figs. 4 and 5) may be made of opaque glass or other suitable substance and hollowed away at certain intervals, leaving radial wings C and intervening gaps for conveying the liquid away down the sides of the post into the vessel, as shown by the arrow, Fig. 1. Said gaps are curved at top and bottom and merge into a rounded shoulder D, so as to prevent any lodgment of matter. Said funnel is preferably made to rest upon ledges E at the base of the wings C, as it is not always convenient for it to be made so accurately (especially if made of clay) as to bite evenly upon the wings and be supported thereby rigidly in a level position. The top of the post is rounded or cone-shaped and is of such a height as to rise up within the funnel B, leaving a free passage through the gaps, or I may provide a small dome independent of the post and attached to the funnel above its central opening.

The post is constructed in one of two ways, according to its intended mode of attachment to the pot. I prefer to employ the suction principle, as illustrated in Fig. 4, this being the form adapted to a chamber-pot already manufactured without any preparation being necessary. For this purpose I take a disk H, of soft rubber, (shown in Figs. 2 and 3,) similar to the kind used for attaching candle-holders to windows, and I pass through the center of same a second stem J, mounted on a small plate J'. The lower part K of the post is preferably molded from clay or porcelain or other like substance and is glazed upon its surface. The upper part A is divided from the lower part K by a water-tight joint L, provided with suitable packing, (cloth, by preference,) and the complete post is entirely non-porous and smooth upon its surface. The interior of the post is hollow, and the upper part carries a central block or core M, of wood or the like, fixed in place by a screw N, passed through the top of the post. A hole O is bored centrally up from the lower end of said core M, and at the mouth of said hole is a screwed nut P, held in place by a small metal plate Q, attached to the core by screws R R. A rabbet is formed in the bottom edge of the post, as at S, adapted to fit over the rim or edge of the suction-disk H, aforesaid, but being rather shallower than the same. The screwed stem J should be screwed into the nut P until the edge of the disk lies within the said rabbet S, and the rubber will then slightly project below the bottom of the post. The post, together with its suction-disk, is now ready for application to the inside base of the pot, where it can be caused to stand upright and firmly adhere to the surface of same by simply applying it firmly and gently to the surface and then commencing to turn the upper part A around several times, thus drawing up the screwed stem J within the core M. The hole O in the latter may be stopped at a suitable point to limit the travel of the spindle to the point at which the suction-disk H will have been pulled up against the opposing force of the vacuum with the greatest efficiency and prospect of the vacuum being maintained for a considerable length of time. I have found by experiment that the vacuum remains unaffected even after several months, provided that a little water be allowed to remain, so as to keep the outside edge of the suction-disk moist. The shape of the said disk is such as shown by Figs. 2 and 3, and a splendid airtight joint with the bottom of the pot is formed by the pressure of the rabbeted edge S upon the rim of the disk. When in effective use, the center of disk H becomes drawn up in the form shown in Fig. 4.

Instead of the above-described method of attachment of the post I may dispense altogether with the suction principle and employ a bolt T, (shown in Fig. 5,) passing through the post (which may be in one piece) and also through the bottom of the chamber-pot, upon the lower side of which a threaded locking-nut U may be screwed. The bottom edge of the post is in this case furnished with a water-tight packing V, let into a groove.

The interior of the post being always kept isolated from the surrounding liquid is not subject to injury or decay. The rubber disk remains in a good state of preservation, and the vacuum (where such is used) lasts for a great length of time, a turn of the post being sufficient to restore it, if necessary.

The funnel B is provided with a short tube or depending rim W, projecting below the center hole and made slightly taper, so as to surround the wings C and rest upon the ledges E aforesaid.

The appliance aforesaid may be manufactured in earthenware, metal, glass, or partly in one material and partly in another. The stem or post may, if convenient in manufacture, be formed (in whole or in part) in one piece with the chamber-pot or like vessel during the process of manufacture of the latter.

Having thus described my invention, what I claim as new, and desire to secure by Letters Patent, is—

1. For use in a chamber-pot or like vessel, the combination of a post adapted to be rigidly fixed therein and a removable funnel resting upon said post and separable therefrom, such post having radial wings and intervening gaps, whereby the liquid may be conducted away from the funnel into the vessel down the outer surface of the post, the whole substantially as described.

2. For use in a chamber-pot or like vessel, the combination with a removable funnel of a supporting-post, a partially-hollow block or core within the upper part of said post, a screwed nut fixed within the mouth of said block or core, a screwed stem working therein, said stem and nut being revoluble in relation to each other, and a suction-disk carried upon said screwed stem, the whole substantially as described.

In witness whereof I have hereunto set my hand in the presence of two witnesses.

THOMAS HAWKINS.

Witnesses:
ARTHUR H. STANLEY,
JAMES LEWIS.